2,818,369

ANESTHETIC SOLUTION FOR INTRASPINAL INJECTION

Froilan P. Luduena, Albany, N. Y., assignor to Sterling Drug Inc., New York, N. Y., a corporation of Delaware No Drawing. Application April 6, 1954
Serial No. 421,430

6 Claims. (Cl. 167—52)

This invention relates to an isotonic, hyperbaric, aqueous solution for intraspinal injection comprising a tertiary-aminoalkyl amino-alkoxybenzoate and inositol as essential ingredients.

The tertiary-aminoalkyl amino-alkoxybenzoates of my solutions are used in the form of their non-toxic acid addition salts. These esters, in the form of their free bases, have the general formula

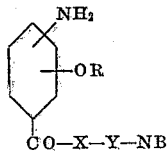

where R is a lower alkyl radical having from one to six carbon atoms, X is O or S, Y is a lower alkylene radical having preferably from two to four carbon atoms and having its two free valence bonds separated by at least two carbon atoms, and NB is a tertiary-amino radical.

While there are many commercially avialable local anesthetic preparations, only a few hyperbaric solutions ever have been or are being used for spinal anesthesia. This is true because, of its very nature, a hyperbaric spinal anesthetic solution must satisfy rigid requirements, such as being isotonic, that is, it must have the same osmotic pressure as the spinal fluid; also, it must have a definite specific gravity exceeding unity; and it must be non-irritating. Moreover, ingredients added to such a solution to give it the desired specific gravity and required tonicity must necessarily be compatible with the local anesthetic.

Anesthetic solutions heavier than spinal fluid, that is, hyperbaric solutions, have been used recently for controlled spinal anesthesia in surgery, e. g., ano-rectal surgery, and more recently for "saddle block" analgesia in obstetrics. Heretofore, the anesthetic of choice in such isotonic, hyperbaric solutions has been 2-dimethylaminoethyl 4-n-butylaminobenzoate (tetracaine) in the form of its hydrochloride salt, and the necessary ingredient for achieving the desired specific gravity and isotonicity has been dextrose. The preparations that have found most use are solutions containing 0.2% (2 mg. per cc.) and 0.3% tetracaine hydrochloride, each having 6% dextrose; their specific gravities are 1.020 and 1.0232 at 20° C., respectively. The specific gravity of spinal fluid varies under normal conditions from 1.001 to 1.009.

The ever continuing search for new and better local anesthetics has within the last ten years resulted in the discovery of the highly potent tertiary-aminoalkyl esters of amino-alkoxybenzoic acids described hereinabove. However, attempts to utilize these highly active esters in intraspinal, hyperbaric solutions resulted in failure heretofore because no ingredient could be found that produced the desired specific gravity, and at the same time, was compatible with the new anesthetics. Attempts to use dextrose failed because it was found to be incompatible with these new amino-alkoxybenzoates, resulting in their gradual decomposition in solution.

Now I have found that an isotonic, hyperbaric, aqueous solution suitable for intraspinal injection can be obtained by incorporating inositol in the solution with the tertiary-aminoalkyl amino-alkoxybenzoate as its acid addition salt. I have found such a solution to be stable, nontoxic and non-irritating to the spinal cord. Also, I have found that the anesthetic activity of the basic esters is unimpaired by the inositol. Illustrative of the local anesthetics in my preparations are the following, which are employed in the form of their non-toxic, acid addition salts, preferably the hydrochlorides: 2-diethylaminoethyl 4-amino-2-n-propoxybenzoate, 2-diethylaminoetheyl 4-amino-2-n-hexoxythiolbenzoate, 2-diethylaminoethyl 4-amino-3-n-butoxybenzoate, 3-(1-piperidyl) propyl 3-amino-4-ethoxybenzoate, 2 - (2,5 - dimethyl - 1 - pyrrolidyl)ethyl 5 - amino - 2 - methoxybenzoate, and the like.

Preferred embodiments of my invention contain about 0.1 to 1.0% (weight per volume) of the tertiary-aminoalkyl-amino-alkoxybenzoate as its acid addition salt and about 1 to 10% (weight per volume) of inositol. The preferred pH range is about 4 to 6 and the preferred specific gravity is about 1.015 to 1.025.

The following examples will illustrate the specific embodiments of my invention without, however, limiting it thereto.

Example 1

A formulation was prepared by mixing well the following ingredients:

| | |
|---|---|
| 2-diethylaminoethyl 4-amino-2-n-propoxybenzoate hydrochloride | g-- 1.5 |
| Inositol | g-- 18.75 |
| Sodium biphosphate ($NaH_2PO_4.H_2O$) | g-- 2.0 |
| Distilled water, q. s. ad | cc-- 500 |

The solution was filtered through a sterilizing filter and the filtrate was sealed in 4 ml. flint ampules, each ampule having been flushed with nitrogen prior to sealing. The ampulled solution was heated for ten minutes in flowing steam at 212° F. The pH of the solution after heating was 4.56 and the specific gravity was 1.0195. The quantity of 2-diethylaminoethyl 4-amino-2-n-propoxybenzoate hydrochloride in this solution was determined by assay to be 3.1 mg. per cc. The anesthetic content did not appreciably diminish on prolonged standing.

The above formulation can be varied by using other buffers, e. g., sodium lactate-lactic acid, in place of sodium biphosphate.

Solutions containing varying quantities of 2-diethylaminoethyl 4-amino-2-n-propoxybenzoate hydrochloride and inositol, prepared as above, have been found to be safe and efficacious for intraspinal injection into animals and humans. For example, solutions containing 0.2% (2 mg. per cc.) of 2-diethylaminoethyl 4-amino-2-n-propoxybenzoate hydrochloride, 5.0% inositol and 0.4% sodium biphosphate have been administered intraspinally to rabbits with no untoward reactions or symptoms of intolerance. The inositol did not interfere with or alter the local anesthetic potency of the basic ester.

Intraspinal studies in dogs using solutions of either 3.75% or 7.5% inositol plus 0.2% 2-diethylaminoethyl 4-amino-2-n-propoxybenzoate hydrochloride and 0.4% sodium biphosphate showed that these solutions are completely tolerated. Histopathological examination of the distal spinal cord and meninges following autopsy showed no evidence of cellular reaction in any of the animals.

Solutions containing 0.3% (3 mg. per cc.) of 2-diethylaminoethyl 4-amino-2-n-propoxybenzoate hydrochloride, 0.4% sodium biphosphate and either 3.74 or 10.0% inositol were injected intraspinally in cats. The injections were made in the lumbosacral space. The degree of anesthesia produced varied from complete and marked anesthesia up to the lumbar region to anesthesia of the tail and hind leg motor incoordination. After the recovery from the immediate effects of the local anesthetic, the cats did not show any adverse symptoms during the following observation period of one week.

Solutions containing 0.4% (4 mg. per cc.) of 2-diethylaminoethyl 4-amino-2-n-propoxybenzoate hydrochloride, 3.75% inositol and 0.4% sodium biphosphate, and having a pH of 4.37 and specific gravity of 1.020, were used successfully to produce spinal anesthesia in over 200 men from twenty to seventy-six years of age during ano-rectal operations, including hemorrhoidectomies, anal fissurectomies, anal fistulectomies, pilonidal cystectomies and miscellaneous rectal operations. The rapid onset, rapid fixation and intermediate duration of these anesthetic solutions are desirable advantages for ano-rectal surgery.

A solution containing 0.5% (5.0 mg. per cc.) 2-diethylaminoethyl 4-amino-2-n-propoxybenzoate hydrochloride, 3.75% (37.5 mg. per cc.) inositol and 0.4% (4.0 mg. per cc.) sodium biphosphate had a pH of 4.5 and a specific gravity of 1.0199 at 25° C.

*Example 2*

The preparation containing the following ingredients was prepared following the procedure given above for Example 1:

| | |
|---|---|
| 2-diethylaminoethyl 4-amino-2-n-butoxybenzoate hydrochloride _____g__ | 1.25 |
| Sodium acetate _____g__ | 0.75 |
| Glacial acetic acid _____cc__ | 0.1875 |
| Inositol _____g__ | 9.375 |
| Distilled water, q. s. ad. _____cc__ | 250 |

This preparation had a pH of 4.8 and was found to assay for 5.12 mg. per cc. of 2-diethylaminoethyl 4-amino-2-n-butoxybenzoate hydrochloride; after three months at 37° C., it had a pH of 4.9 and assayed for 5.07 mg. per cc. of 2-diethylaminoethyl 4-amino-2-n-butoxybenzoate hydrochloride.

A similar preparation containing 0.1% (1 mg. per cc.) of 2-diethylaminoethyl 4-amino-2-n-butoxybenzoate hydrochloride and a 0.4% sodium biphosphate buffer was prepared with the following ingredients:

| | |
|---|---|
| 2-diethylaminoethyl 4-amino-2-n-butoxybenzoate hydrochloride _____g__ | 1.0 |
| Sodium biphospate _____g__ | 4.0 |
| Inositol _____g__ | 37.5 |
| Distilled water, q. s. ad. _____cc__ | 1000 |

The pH of this preparation was 4.55.

A solution containing 0.25% (2.5 mg. per cc.) 2-diethylaminoethyl 4-amino-2-n-butoxybenzoate hydrochloride, 3.75% (37.5 mg. per cc.) inositol and 0.40% (4.0 mg. per cc.) of sodium biphosphate had a pH of 4.5 and a specific gravity at 25° C. of 1.0195.

These preparations containing 2-diethylaminoethyl 4-amino-2-n-butoxybenzoate hydrochloride, like those described above that contain 2-diethylaminoethyl 4-amino-2-n-propoxybenzoate hydrochloride, have been found to be safe and efficacious for intraspinal injection into animals and humans.

Other satisfactory isotonic, hyperbaric, aqueous solutions for intraspinal injection can be prepared in accordance with the foregoing descriptions of Examples 1 and 2 by varying the percentages of the ingredients, using other buffers or using in place of the given basic esters other tertiary-aminoalkyl amino-alkoxybenzoates, as their acid addition salts, such as: 2-diethylaminoethyl 4-amino-2-n-butoxythiolbenzoate, 2-diethylaminoethyl 4-amino-3-n-butoxybenzoate, 2-diethylaminoethyl 4-amino-2-n-hexoxybenzoate, 3-(1-piperidyl)propyl 3-amino-4-ethoxybenzoate, 2-(2,5-dimethyl-1-pyrrolidyl)ethyl 5-amino-2-methoxybenzoate, and the like.

I claim:

1. An isotonic, hyperbaric, aqueous anesthetic solution for intraspinal injection comprising a non-toxic acid addition salt of 2-diethylaminoethyl 4-amino-2-(lower alkoxy) benzoate and inositol as essential ingredients.

2. An isotonic, hyperbaric, aqueous anesthetic solution for intraspinal injection comprising a non-toxic acid addition salt of 2-diethylaminoethyl 4-amino-2-n-propoxybenzoate and inositol as essential ingredients.

3. An isotonic, hyperbaric, aqueous anesthetic solution for intraspinal injection comprising a non-toxic acid addition salt of 2-diethylaminoethyl 4-amino-2-n-butoxybenzoate and inositol as essential ingredients.

4. An isotonic, hyperbaric, aqueous anesthetic solution for intraspinal injection comprising about 0.1 to 1.0% 2-diethylaminoethyl 4-amino-2-n-propoxybenzoate hydrochloride, about 1 to 10% inositol and a buffer, and having a pH of about 4 to 6 and a specific gravity of about 1.015 to 1.025.

5. An isotonic, hyperbaric, aqueous anesthetic solution for intraspinal injection comprising about 0.1 to 1.0% 2-diethylaminoethyl 4-amino-2-n-butoxybenzoate hydrochloride, about 1 to 10% inositol and a buffer, and having a pH of about 4 to 6 and a specific gravity of about 1.015 to 1.025.

6. An aqueous anesthetic solution including a non-toxic acid addition salt of a tertiary-aminoalkyl amino-alkoxybenzoate in which the amino and alkoxy groups are substituents of the benzene nucleus, said solution having incorporated therein inositol, whereby an isotonic, hyperbaric composition for intraspinal injection is obtained.

References Cited in the file of this patent
UNITED STATES PATENTS

| | | |
|---|---|---|
| 2,484,128 | Stern _____ | Oct. 11, 1949 |

OTHER REFERENCES

Luduena: J. of Pharmacology and Experimental Therapeutics, vol. 104, January 1952, pp. 40–53.

U. S. Dispensatory, 24th ed. (1947), p. 1488.

Sadove: J. of Proctology, vol. 4, December 1953, pp. 315–519.

Ache: Chem. Abstr., vol. 40 (1946), p. 7525.